United States Patent
Quinn et al.

(10) Patent No.: US 7,363,390 B2
(45) Date of Patent: Apr. 22, 2008

(54) TECHNIQUES FOR MANAGING A STORAGE ENVIRONMENT

(75) Inventors: Steven Quinn, San Diego, CA (US); Rick Stout, El Cajon, CA (US); Justin O'Hagan, East Brisbane (AU)

(73) Assignee: Hitachi, Ltd., Tokyo (JP)

( * ) Notice: Subject to any disclaimer, the term of this patent is extended or adjusted under 35 U.S.C. 154(b) by 864 days.

(21) Appl. No.: 10/374,319

(22) Filed: Feb. 25, 2003

(65) Prior Publication Data

US 2004/0006616 A1 Jan. 8, 2004

Related U.S. Application Data

(60) Provisional application No. 60/383,097, filed on May 23, 2002.

(51) Int. Cl.
*G06F 3/00* (2006.01)
*G06F 13/12* (2006.01)
*G06F 15/16* (2006.01)
*G06F 15/173* (2006.01)

(52) U.S. Cl. .............................. 710/5; 710/36; 710/62; 709/227; 709/230; 709/238

(58) Field of Classification Search ............. 710/33–35
See application file for complete search history.

(56) References Cited

U.S. PATENT DOCUMENTS

| 5,802,345 | A * | 9/1998 | Matsunami et al. ......... 710/260 |
| 6,219,727 | B1 * | 4/2001 | Kailash et al. ................ 710/48 |
| 6,385,683 | B1 * | 5/2002 | DeKoning et al. ............ 710/48 |
| 2003/0105920 | A1 * | 6/2003 | Rodriguez et al. .......... 711/114 |

* cited by examiner

*Primary Examiner*—Alan S. Chen
(74) *Attorney, Agent, or Firm*—Townsend and Townsend and Crew LLP

(57) ABSTRACT

Techniques for managing a storage environment. According to an embodiment of the present invention, high-level application programming interfaces (APIs) are provided that can be used by applications such as storage management applications (e.g., ERM applications, SRM applications) to manage a storage environment. Using these APIs, an application can issue simple high-level commands to perform storage management operations without having to worry about the low level storage array-specific commands. Embodiments of the present invention handle the necessary translations between the high-level commands and the low-level storage array-specific commands or protocols.

30 Claims, 7 Drawing Sheets

TECHNIQUES FOR MANAGING A STORAGE ENVIRONMENT

CROSS-REFERENCES TO RELATED APPLICATIONS

The present application is a non-provisional of and claims priority from U.S. Provisional Application No. 60/383,097 filed May 23, 2002. The entire contents of the above-mentioned provisional application are herein incorporated by reference for all purposes.

BACKGROUND OF THE INVENTION

The present invention relates to techniques for managing computer systems, and more particularly to techniques for managing storage environments.

With the proliferation of computers and network systems, an increasing amount of information is being stored in electronic form. This has given rise to large and heterogeneous storage environments for storing the information. Due to their heterogeneity and complexity, managing these storage environments is a difficult and complex task.

Several application programs (e.g., enterprise resource management (ERM) applications, storage resource manager (SRM) applications) are presently available for managing storage environments. Many of these use standardized protocols such as the Simple Network Management Protocol (SNMP) protocol for communicating with the storage environments. However, controlling a storage environment using conventional protocols such as SNMP is a complex endeavor. In order to accomplish even a simple task, the storage management application program typically has to issue multiple SNMP commands to the storage environment. For example, as shown in FIG. 1, in order to add a volume to a storage array 100, an ERM application 102 has to send a series of SNMP commands 104 to the storage array. Even though some commands can be grouped into SNMP PDUs (Protocol Data Units), multiple commands are required and the ERM application has to constantly monitor the results of the commands. As another example, a commonly performed task such as discovering a storage array and getting configuration information for the storage array takes several SNMP commands to accomplish.

Issuing multiple commands and monitoring responses to the multiple commands is difficult and tedious for storage management applications and is very processing-intensive. Further, since SNMP uses the User Datagram Protocol (UDP) protocol that does not guarantee message delivery, the storage management application has to implement techniques to verify delivery of the SNMP messages to the storage environment and to ensure that responses are not lost. As a result, conventional storage management applications have to implement techniques such as polling loops, techniques for detecting SNMP traps, and other like techniques to ensure that the SNMP command was delivered to the storage environment and to detect responses to the SNMP commands. As a result, conventional storage environment management programs are generally quite complex and difficult to develop.

Additionally, configuration data related to a storage environment is usually stored and represented as a table. For example, information related to each Port of a storage array may be stored as a table row and properties of a Port (e.g., port identifier) are stored in columns of the table. SNMP (version 1) does not support the ability to retrieve values stored in a table in a single operation. As a result, using SNMP (version 1), if a storage management application needs to get information from a table storing information for elements of a storage array and their properties (e.g., information for all ports of a storage array), the application has to issue a separate request for each property of the element and then repeat that for each row of the table. This can be quite tedious and further increases the complexity of the storage management software.

From the above, it can be seen that improved techniques for managing storage environments are desired.

BRIEF SUMMARY OF THE INVENTION

Embodiments of the present invention provide improved techniques for managing a storage environment. According to an embodiment of the present invention, high-level application programming interfaces (APIs) are provided that can be used by applications such as storage management applications (e.g., ERM applications, SRM applications) to manage a storage environment. Using these APIs, an application can issue simple high-level commands to perform storage management operations without having to worry about the low level storage array-specific commands. Embodiments of the present invention handle the necessary translations between the high-level commands and the low-level storage array-specific commands or protocols.

According to an embodiment of the present invention, a technique is provided for managing a storage environment. An embodiment of the present invention receives a request to perform a first command on a storage array in the storage environment. A first plurality of commands corresponding to the first command is determined. Commands in the first plurality of commands belong to a first communication protocol used for communicating with the storage array. The first plurality of commands is then communicated to the storage array. One or more responses to the first plurality of commands are detected and a first response to the request to perform the first command is generated based upon the one or more responses.

According to another embodiment of the present invention, techniques are provided for managing a storage environment where a signal is received indicating invocation of a first application programming interface (API). A first command to be performed corresponding to the first API is determined. A first plurality of commands belonging to a first communication protocol used for communicating with the storage array are then determined for the first command. The first plurality of commands is then communicated to the storage array. One or more responses to the first plurality of commands are detected and a first response to the first API is generated based upon the one or more responses.

The foregoing, together with other features, embodiments, and advantages of the present invention, will become more apparent when referring to the following specification, claims, and accompanying drawings.

DETAILED DESCRIPTION OF THE INVENTION

Embodiments of the present invention provide improved techniques for managing a storage environment. According to an embodiment of the present invention, high-level application programming interfaces (APIs) are provided that can be used by applications such as storage management applications (e.g., ERM applications, SRM applications) to manage a storage environment. Using these APIs, a storage environment management application ("management application") can issue simple high-level commands to perform storage management operations without having to worry about the low level storage array-specific implementation (e.g., SNMP commands) of the operations. Embodiments of the present invention handle the necessary translations between the high-level commands and the low-level storage array-specific commands or protocols and thus hide the low-level storage array-specific implementation details from the management application. As a result, the present invention simplifies development and complexity of management applications. Embodiments of the present invention also use communication protocols (e.g., TCP/IP) that guarantee delivery of a message or command. Embodiments of the present invention also support table operations. As a result, management applications can acquire or set multiple values from a storage environment (e.g., information for ports of a storage array) by issuing a single command rather than multiple commands.

Figure 2:
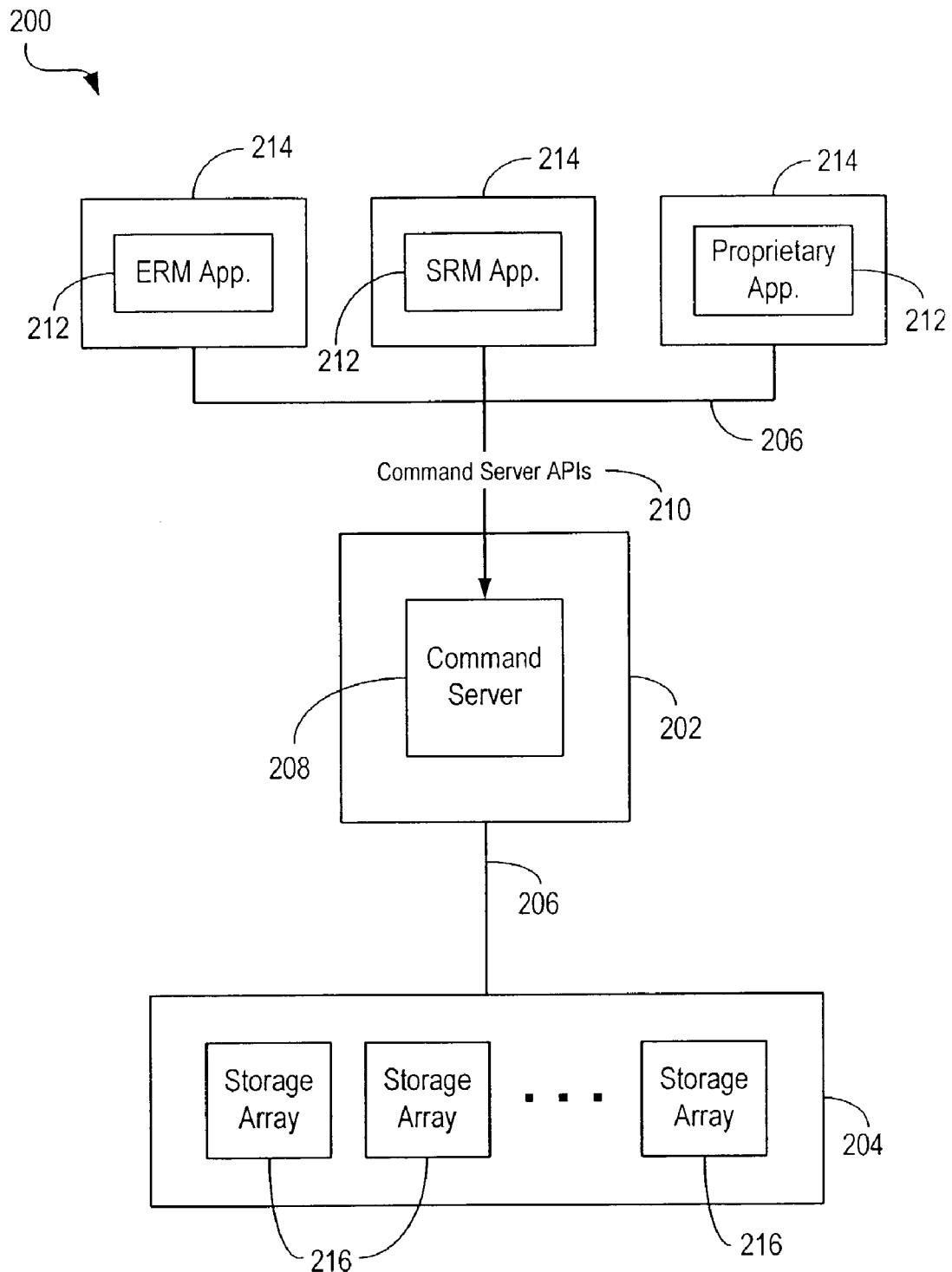
FIG. 2 is a simplified high-level block diagram of a system that may incorporate an embodiment of the present invention.

FIG. 2 is a simplified high-level block diagram of a system 200 that may incorporate an embodiment of the present invention. As shown, system 200 comprises a computer system 202 coupled to a storage environment 204 via communication links 206. Computer system 202 is configured to execute a command server application program 208 ("command server 208") according to an embodiment of the present invention. Command server 208 provides high-level APIs 210 that may be used by client applications 212 to manage storage environment 204.

Figure 1:
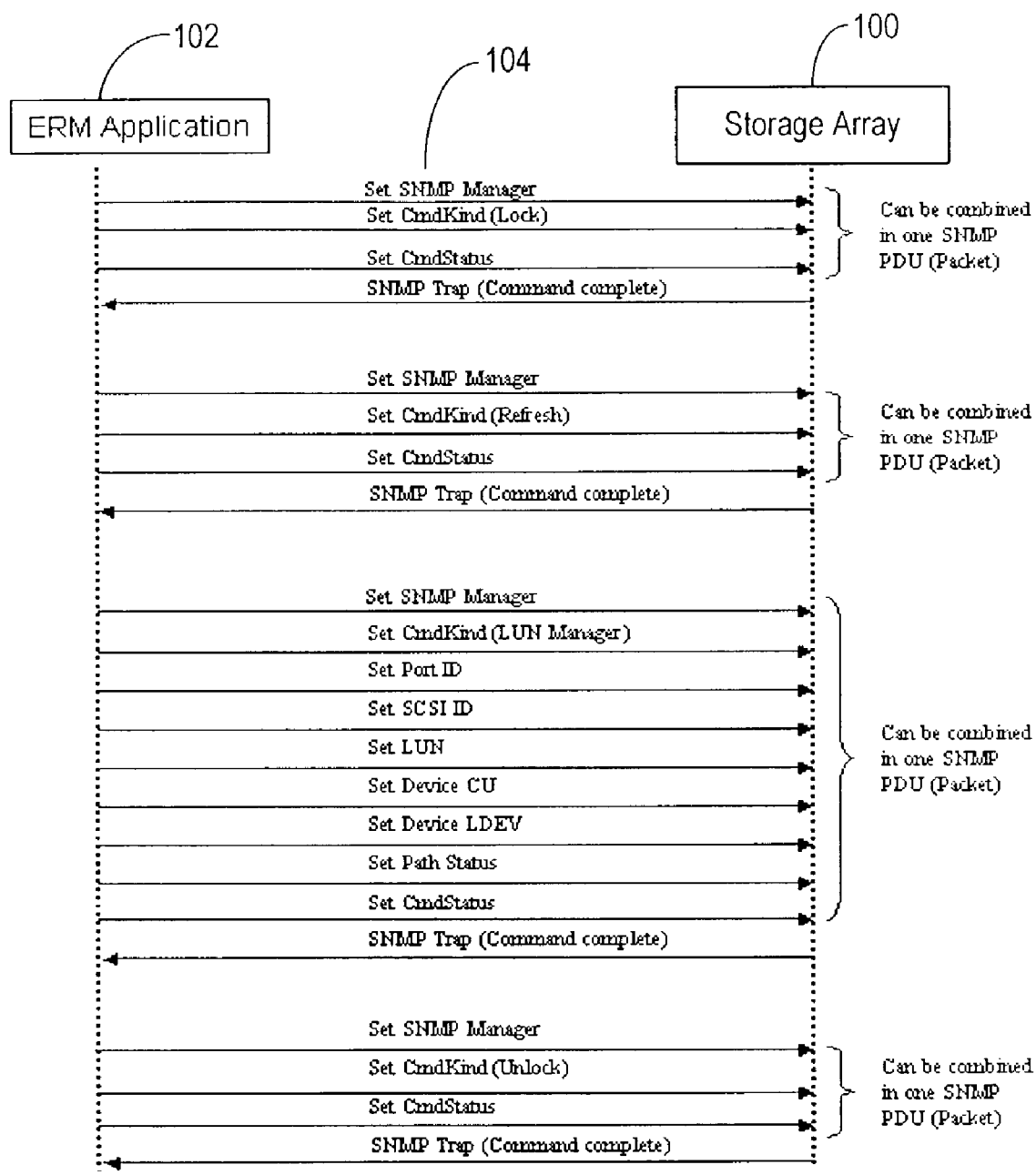
FIG. 1 depicts flow of SNMP commands between an ERM application and a storage array for adding a volume to the storage array.

For purposes of this application, the term "client application" is intended to include any program, application, or process that makes use of services and APIs provided by command server 208. Client applications may include storage management applications such as ERM applications, SRM applications, proprietary applications, and the like. These applications may use a command line interface (CLI based), a graphical user interface (GUI based), or other types of interfaces. Client applications 212 may execute on computer system 202 or on other computer systems 214 (as shown in FIG. 1) that are able to communicate with computer system 202 via communication links 206. System 200 depicted in FIG. 1 is merely illustrative of an embodiment incorporating the present invention and does not limit the scope of the invention as recited in the claims. One of ordinary skill in the art would recognize other variations, modifications, and alternatives.

Communication links 206 depicted in FIG. 2 may be of various types including hardwire links, optical links, satellite or other wireless communications links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others. The communication links may traverse one or more communication networks including the Internet, an intranet, a wireless network, a private network, a public network, a switched network, or any other suitable communication network.

Storage environment 204 may comprise one or more storage arrays 216. For purposes of this application, the term "storage environment" is intended to refer to a configuration or environment including one or more storage arrays. For purposes of this application, the term "storage array" is intended to comprise one or more storage devices, and associated one or more controllers, processors, and/or communication ports. Examples of storage devices include memory disks/drives, raid structures, optical disks/drives, tapes, solid state disks (SSDs), etc. For purposes of this application, managing a storage environment may include operations for configuring one or more components (e.g., storage arrays) of the storage environment, modifying the storage environment, getting status of the storage environment, adding components to the storage environment, deleting components from the storage environment, and other operations affecting or relating to the storage environment.

As described above, command server 208 provides high-level command APIs (or function calls) 210 that may be used by client programs 212 to manage storage environment 204. According to an embodiment of the present invention, an API represents a command request (or function call) requesting performance of a command (or function) when the API is invoked. An API may include parameters, if any, needed to perform the requested command or function. A response may also be defined for an API. A response for a command request includes the result or status of performing the requested command. The response may be based on one or more responses received by command server 208 from storage environment 204 in response to performing one or more operations corresponding to the command request. Various message formats and protocols may be used to communicate command requests from client applications 212 to command server 208 and to communicate responses from command server 208 to client applications 212. According to an embodiment of the present invention, command requests and responses are communicated using XML messages.

According to an embodiment of the present invention, command server 208 and client applications 212 communicate using a communication protocol that guarantees delivery of command requests to command server 208 and of corresponding responses to client applications 212. According to an embodiment of the present invention, clients 212 and command server 208 communicate using the TCP/IP protocol. A HTTP messaging protocol over TCP/IP may also be used. Various other protocols may also be used. As a result of using protocols that guarantee delivery of commands requests to command server 208 and of corresponding responses to client applications 212, unlike prior art systems, client applications 212 do not have to provide their own techniques for verifying delivery of command requests.

A client application 212 and command server 208 may communicate with each other in one of several command modes. In a synchronous command mode, a client invokes an API provided by command server 208 requesting performance of a command and waits until a response to the command request is communicated to client application 212 by command server 208 upon completion of processing corresponding to the command request. In an asynchronous mode, after invoking an API provided by the command server 208, client application does not have to wait to receive a response from command server 208 to the command request corresponding to the API. In an asynchronous embodiment, client application 212 may periodically poll command server 208 to determine if the requested command has been completed. If the requested command has not been completed, command server 208 may return a "Processing" status to client application 212. When the processing has been completed, command server 208 may return a "Completed" status to client application 212 along with the response generated for the requested command.

According to another embodiment, a "publish/subscribe" command mode may be used. In this mode, a client application 212 subscribes to events (or topics) on the command server 208 that are of interest to the client application. For example, client application 212 may subscribe to a response to a command request (or event) invoked by the client application. Accordingly, when the particular event occurs (e.g., the command request has been completed), command server 208 notifies client 212 (or publishes to the client) of the event and client 212 can receive the response to the command request.

Command server 208 is configured to receive a command request in response to an API invoked by a client application 212 and to determine processing necessary for servicing the command request. According to an embodiment of the present invention, command server 208 determines a particular storage array to which the command request is directed. Upon determining the particular storage array, command server determines a communication protocol for communicating with the particular storage array. Examples of communication protocols used by a storage array may include SNMP using UDP/IP, TCP/IP, protocols proprietary to the storage array, and various other protocols. Upon determining a protocol used by the particular storage array, command server 208 determines one or more commands (also referred to as "low level commands") in the protocol used by the storage array to perform the command requested by client application 212.

Command server 208 is configured to communicate the one or more low-level commands to the storage array. Command server 208 controls and manages the order and sequence in which the one or more commands are communicated to the storage array. Command server 208 is configured to monitor one or more responses received from the storage array in response to the low level commands. Various different techniques such as polling, traps, etc. may be used to monitor responses received from the storage array in response to the low level commands. Based upon the responses received from the storage environment, command server 208 generates a response to the command request received from client application 212 and communicates the generated response to client application 212. Further details related to processing performed by command server 208 are described below.

It should be understood that a command request from a client application 212 may be directed to multiple storage arrays in the storage environment. In this embodiment, command server 208 is configured to communicate the low-level commands corresponding to the requested high-level command to the multiple storage arrays and monitor responses from the multiple storage arrays. A response based upon responses received from the multiple storage arrays is then communicated to the client application that invoked the API resulting in the command request.

Figure 3:
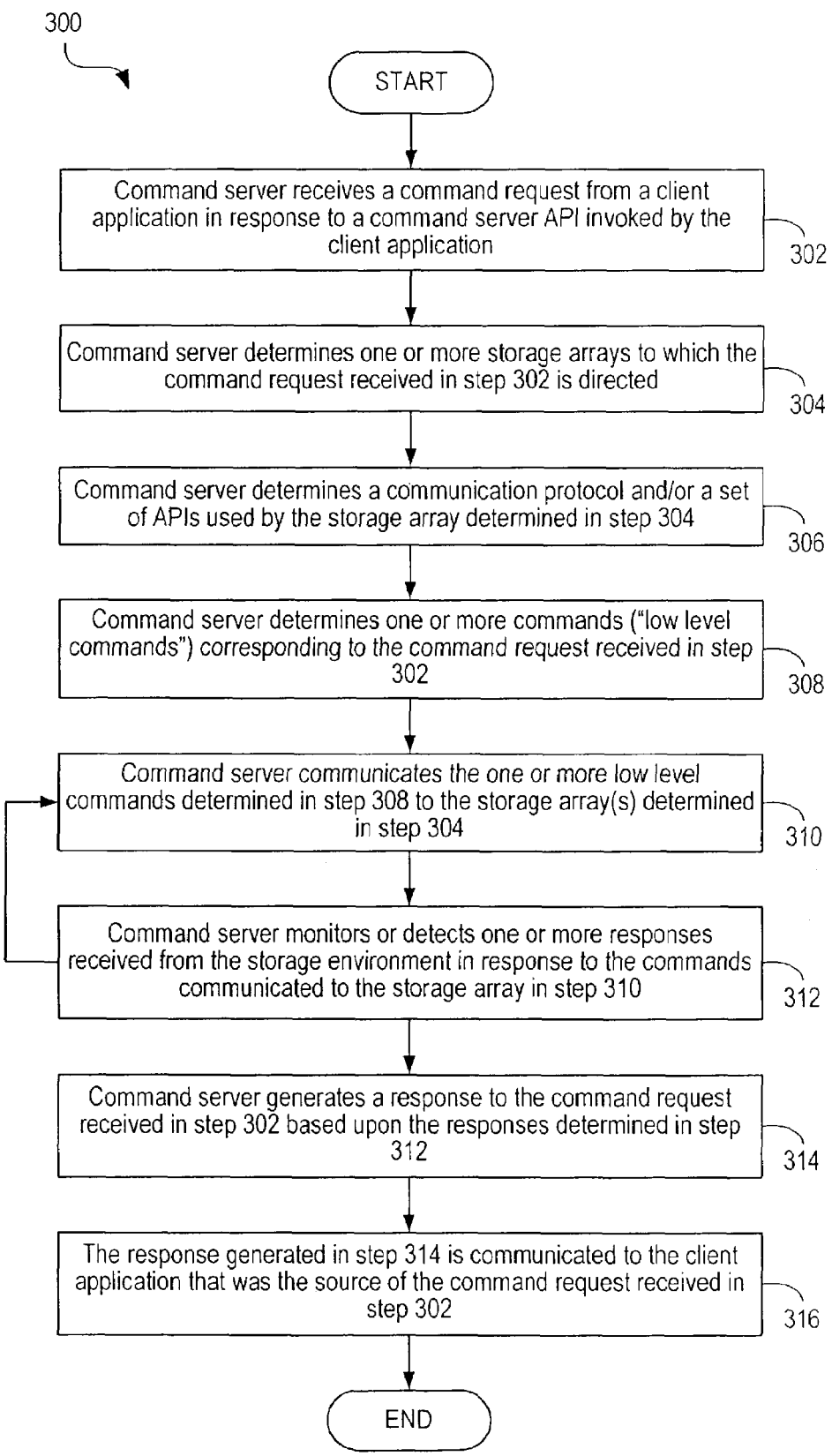
FIG. 3 is a simplified high-level flowchart depicting processing performed by a command server according to an embodiment of the present invention.

FIG. 3 is a simplified high-level flowchart 300 depicting processing performed by command server 208 according to an embodiment of the present invention. The processing depicted in FIG. 3 may be performed by software modules implementing command server 208, hardware modules of computer system 202, or combinations thereof. In alternative embodiments, the processing may be performed by command server 208 in association with other servers or application programs. Flowchart 300 depicted in FIG. 3 is merely illustrative of an embodiment incorporating the present invention and does not limit the scope of the invention as recited in the claims. One of ordinary skill in the art would recognize variations, modifications, and alternatives.

As depicted in FIG. 3, processing is initiated when command server 208 receives a command request from a client application 212 in response to a command server API invoked by client application 212 (step 302). As described above, command server 208 may receive the request using various communication protocols such as XML or HTML messaging over TCP/IP, etc. According to an embodiment of the present invention, the command request is received using a communication protocol that guarantees delivery of the command request to command server 208.

Command server 208 then determines one or more storage arrays to which the command request received in 302 is directed (step 304). It is assumed for purposes of explaining flowchart 300 that a single storage array is determined in step 304. Command server 208 then determines a communication protocol used by the storage array determined in step 304 (step 306). The communication protocol may correspond to a set of APIs used by the storage array for communication. Examples of communication protocols used by a storage array include SNMP using UDP/IP, TCP/IP, protocols proprietary to the storage array, and various other protocols.

Command server 208 then determines one or more commands ("low level commands") corresponding to the command request received in step 302 (step 308). The low level commands determined in step 308 are in the communication protocol (e.g., part of the APIs) determined in step 306. For example, if it is determined in step 306 that the storage array is configured to receive SNMP commands, in step 308, command server 208 determines one or more SNMP commands corresponding to the command request received in step 302.

Command server 208 then communicates the one or more low level commands determined in step 308 to the storage array(s) determined in step 304 (step 310). According to an embodiment of the present invention, command server 208 controls the manner and sequence in which the low level commands are communicated to the storage array. For example, command server 208 may generate SNMP PDUs to communicate the SNMP low level commands to the storage array.

Command server 208 then monitors or detects one or more responses received from the storage environment in response to the commands communicated to the storage array (step 312). Various different techniques such as polling, detection of traps, etc. may be used to detect responses to the commands. Command server 208 may detect a response by receiving the response from the storage environment, by monitoring trap conditions, by using polling, etc. The storage environment may generate a response for each low level command communicated to the storage array or alternatively may generate a response for a group of low level commands.

Depending on the number and nature of the low level commands, the sequence in which the commands are to be communicated to the storage array, and the responses to be monitored, steps 310 and 312 may be performed in sequence one or more times. For example, a first subset of low level commands determined in step 308 may be communicated to the storage array, responses to the first subset determined, then a second subset of the low level commands determined in step 308 may be communicated to the storage array, responses to the second subset determined, and so on until all the low level commands determined in step 308 have been processed.

After all the commands determined in step 308 have been processed (or earlier if there was a special condition or failure of some sort), command server 208 generates a response to the command request received in step 302 based upon the responses determined for the low level commands in step 312 (step 314).

The response generated in step 314 is then communicated to the client application that was the source of the command request received in step 302 (step 316). As described above, the manner in which the response is communicated to the client application may depend on the command mode of the client application. For example, in a synchronous mode, command server 208 may communicate the response to the client application after processing of the command request has been completed. In an asynchronous command mode, the response may be communicated to the client application when the client application polls command server 208. In a publish/subscribe mode, the response may be communicated to the client application when command server 208 determines that an event (e.g., completion of the command request) has occurred to which the client application has subscribed. Other command modes may also be used.

Figure 4:
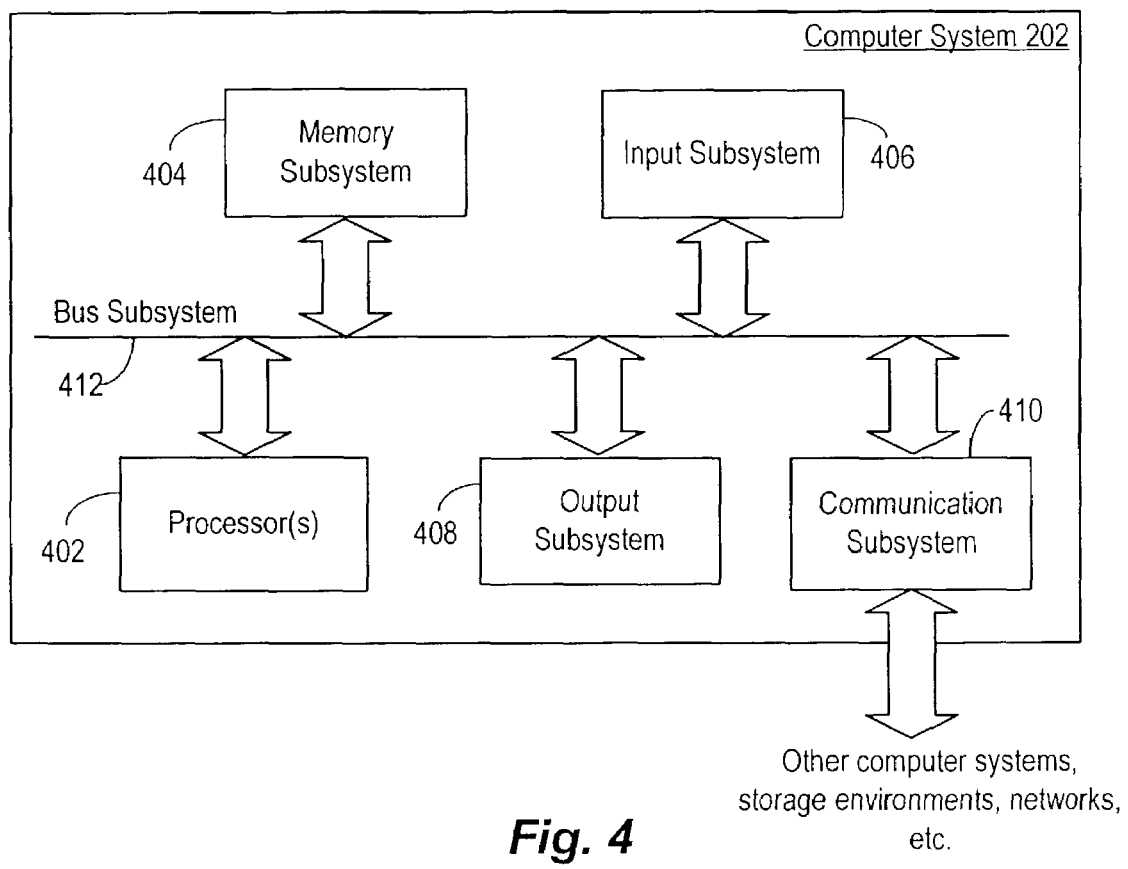
FIG. 4 depicts a simplified block diagram of a computer system according to an embodiment of the present invention.

The processing described above may be implemented in hardware, or software, or combinations of hardware and software. According to an embodiment of the present invention, the processing is implemented by computer programs or code modules executing on a computer system such as computer system 202 depicted in FIG. 2. FIG. 4 depicts a simplified block diagram of computer system 202 according to an embodiment of the present invention. As depicted in FIG. 4, computer system 202 may include a processor 402, a memory subsystem 404 (including volatile and non-volatile memory and/or storage elements) coupled to processor 402 and readable by processor 402, an input subsystem 406, an output subsystem 408, and a communication subsystem 410. Bus subsystem 412 provides a mechanism for letting the various components and subsystems of computer system 202 to communicate with each other as intended. Although bus subsystem 412 is shown schematically as a single bus, alternative embodiments of the bus subsystem may utilize multiple busses.

Input subsystem 406 may include a keyboard, a pointing device, a mouse, a trackball, a touchpad, a graphics tablet, a scanner, a barcode scanner, a touchscreen incorporated into the display, an audio input device such as a voice recognition system, a microphone, and other types of input devices. In general, input subsystem 406 may include all possible types of devices and ways to input information to computer system 202.

Output subsystem 408 may include a display subsystem, a printer, a fax machine, or non-visual displays such as audio output devices. The display subsystem may be a cathode ray tube (CRT), a flat-panel device such as a liquid crystal display (LCD), a projection device, and the like. In general, output subsystem 408 may include all possible types of devices and ways to output information from computer system 202.

Memory subsystem 404 may store the code modules/programs and data constructs that provide the functionality of the present invention. These code modules and programs may be executed by processor 402. Memory subsystem 404 may include one or more volatile and/or non-volatile memories.

Communication subsystem 410 provides an interface to other computer systems, storage environments, communication networks, etc. Communication subsystem 410 facilitates communication of data to and from computer system 202.

Computer system 202 can be of varying types including a personal computer, a portable computer, a workstation, a network computer, a mainframe, a kiosk, a personal digital assistant (PDA), or any other data processing system. Due to the ever-changing nature of computers and networks, the description of computer system 202 depicted in FIG. 4 is intended only as a specific example for purposes of illustrating the preferred embodiment of the computer system. Many other configurations of a computer system are possible having more or fewer components than the computer system depicted in FIG. 4.

Figure 5:
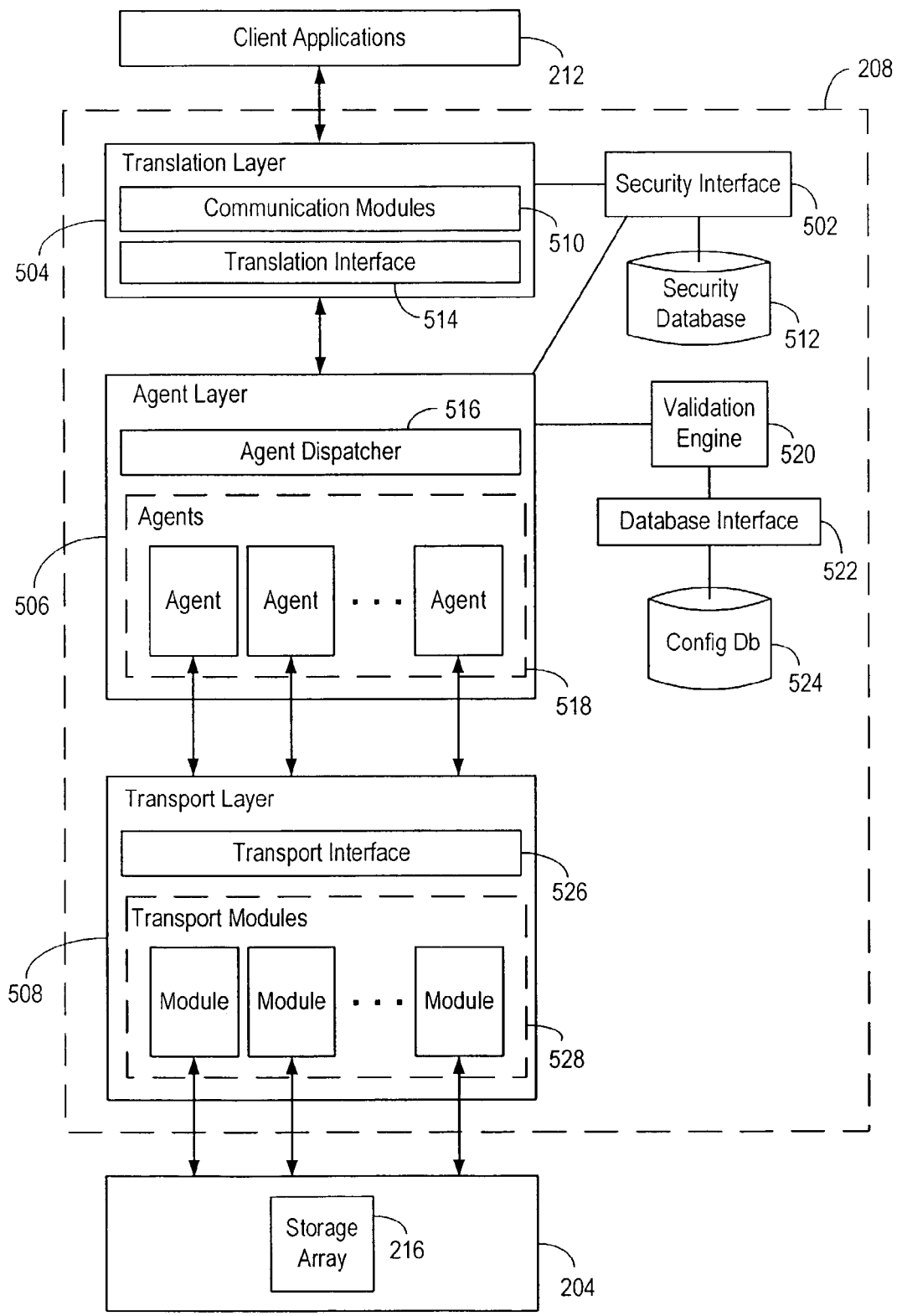
FIG. 5 depicts a simplified block diagram of a command server according to an embodiment of the present invention.

FIG. 5 depicts a simplified block diagram of command server 208 according to an embodiment of the present invention. In the embodiment depicted in FIG. 5, command server 208 comprises a plurality of layers including a security layer 502, a translation layer 504, an agent (or module) layer 506, and a transport layer 508. The architecture depicted in FIG. 5 is merely illustrative of an embodiment incorporating the present invention and does not limit the scope of the invention as recited in the claims. One of ordinary skill in the art would recognize other variations, modifications, and alternatives.

Client applications 212 may include applications that use services and APIs provided by command server 208. Examples of client applications 212 include storage management applications, third party applications, other command server 208 applications, and other applications. Client applications may use different message types/formats and communication protocols to communicate command requests to command server 208. Examples include XML format, HTTP format, command line interface format, various proprietary formats, and others.

Translation layer 504 is configured to receive command requests from client applications 212 in response to command server APIs invoked by the client applications. For example, translation layer 504 may receive a command to add a volume to a storage array. The command may be received responsive to an "AddVolume" API provided by command server 208 and invoked by a client application. According to an embodiment of the present invention, translation layer 504 comprises communication modules 510 that are configured to interface with client applications 212. Communication modules 510 are configured to receive command requests from client applications 212 and to communicate responses to client applications 212. Communication modules 510 may use various protocols and formats for interfacing with client applications 212. Each module 510 may be configured to handle command requests and response for a particular protocol. For example, translation layer 504 may include a HTTP/XML client interface module for communicating with a client application using the HTTP/XML protocol, a command line interface (CLI) module for communicating with CLI applications, and the like.

Translation layer 504 makes use of services provided by security layer/interface 502 to authenticate and authorize command requests received from client applications 212. As part of the authentication and authorization process, security layer 502 authenticates the originator client application (or user using the client application) of the command request, determines if the originator is permitted to access command server 208, and if the originator is permitted to perform the requested command. Security layer 502 may make use of information (e.g., user identification and access rights information) stored in a security database 512 to perform the authentication and authorization process. Processing of the command request is terminated if it is determined that the user or originator could not be authenticated or that the user or originator was not authorized to perform the requested command.

According to an embodiment of the present invention, translation layer 504 also comprises a translation interface 514 that is configured to convert or translate the command requests received from client applications 212 into a standard message format with a standard interface. The translated command request is then forwarded to agents layer 506 for further processing.

Agent layer 506 comprises an agent dispatcher 516 and a set of agents (or modules) 518. For each translated command request received from translation layer 504, agent dispatcher 516 is configured to select and invoke one or more agents 518 for processing the command request. For example, agent dispatcher 516 may select an "AddVolume" agent for processing an AddVolume command request received from a client application.

Each agent is configured to perform a specific set of operations. For example, the AddVolume agent is configured to perform operations related to adding a volume to a storage array. Operations for an AddVolume command request may include gaining exclusive access to (or locking) the storage array, getting the latest data configuration of the storage array, adding a volume to the storage array, verifying that the volume was properly added, releasing the lock on the storage array, and other operations.

According to an embodiment of the present invention, an agent directs performance of an operation by invoking one or more APIs or functions provided by transport layer 508. For example, the AddVolume agent may invoke a first transport layer API to lock the storage, a second API to get the latest data configuration of the storage array, a third API to add a volume to the storage array, a fourth API to verify that the volume was properly added, a fifth API to release the lock on the storage array, and so on.

Agent layer 506 is also configured to accumulate responses received from transport layer 508 in response to APIs invoked by the agents. Agent layer 506 is configured to generate a response for the command request received from translation layer 504 based upon the responses received from transport layer 508. The generated response is then communicated to the client application via translation layer 504.

According to an embodiment of the present invention, agent layer 506 validates the requested command using validation engine 520. Validation includes several tasks including ensuring that the parameters (if any) provided for the requested command are correct (e.g., the values of the parameters are within a correct range, the specified object such as Port or storage device (sometimes also referred to as a logical device or LDEV in short) actually exists on the array). Validation engine makes use of database interface 522 and information stored in configuration database 524 to perform the validation. According to an embodiment of the present invention, configuration database 524 stores a cached copy of the configuration (ports, paths, storage devices (LDEVs)) for each storage array in the storage environment. Agent layer 506 may also make use of services provided by security layer 502.

Transport layer 508 comprises a transport interface 526 and one or more transport modules 528. Transport interface 526 provides APIs that can be used by agents 518 to perform operations corresponding to the command request. The APIs provided by transport interface 526 are independent of the storage arrays on which the operations are to be performed. For each transport interface API invoked by an agent 518 from agent layer 506, transport interface 526 selects a transport communication module 528 for performing processing for the invoked API. According to an embodiment of the present invention, a transport communication module 528 is selected that can communicate with the storage array to which the API function is directed. Accordingly, in order to select a transport communication module 528, transport interface 526 determines a communication protocol that can be used to communicate with the storage array to which the API is directed and selects an appropriate transport module 528 that is configured to communicate with the storage array using the protocol. For example, if SNMP commands are used to communicate with the storage array, an SNMP transport module may be selected. One or more transport modules may be provided for the communication protocols supported or used by the storage arrays. For examples, modules may be provided for supporting the SNMP protocol, Disk Array Management Program (DAMP) protocol of Hitachi, Ltd., Command Control Interface (CCI) protocol of Hitachi, Ltd., proprietary protocols, and other protocols.

Each transport module 528 selected by transport interface 526 is configured to determine low level commands corresponding to the transport interface API invoked by an agent from agent layer 506. The low level commands represent commands or APIs selected from the communication protocol (or set of APIs) supported by the storage array. For example, if the AddVolume agent from agent layer 506 has invoked a transport interface API to lock a storage array and SNMP protocol is used to communicate with the storage array, the transport module selected by transport interface 526 for handling processing for the API may determine the following SNMP low level commands for locking the storage array: Set Manager, Set CmdKind, Set CmdStatus. The transport module communicates the low level commands to the particular storage array. The transport module also monitors responses received from storage environment 204 in response to the low level commands communicated to the storage array. The transport module may forward the responses to the selected agent in agent layer 506.

As described above, a modular architecture is used to implement command server 208. For example, each layer represents a module of code that can be easily replaced for a particular application of command server 208. For example, the security interface can be easily replaced to enhance security without affecting the other layers of command server 208. New hardware interfaces and storage arrays can be supported by plugging in an appropriate transport layer module.

Due to the layered architecture, new releases of storage array microcode implementing new features can also be easily supported. Different version levels of the microcode can also be easily supported. For example, in a storage environment, two identical storage arrays may have different levels of microcode with different functionalities (e.g., a first storage array may have microcode level 12 that supports feature "X" while a second storage array may have microcode level 10 that does not support feature "X"). In this scenario, two different transport layer modules configured to the different microcode levels may be used to talk to each array. In this manner, multiple versions of microcode can be easily supported.

Figure 6:
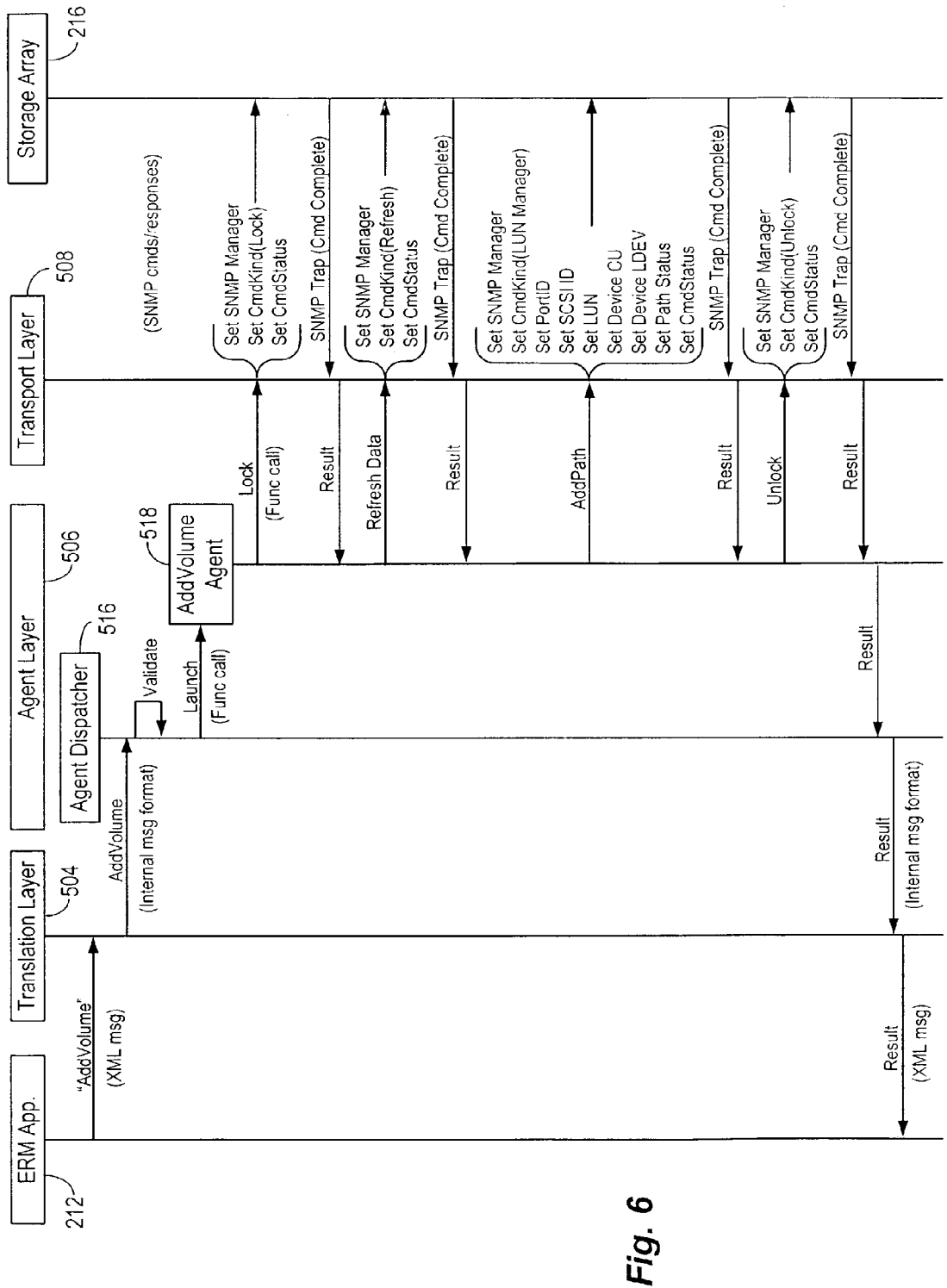
FIG. 6 depicts a simplified data flow diagram showing flow of data between the various layers of a command server according to an embodiment of the present invention.

FIG. 6 depicts a simplified data flow diagram showing flow of data between the various layers of command server 208 according to an embodiment of the present invention. As shown, an ERM client application 212 sends a command request to translation layer 504 by invoking an "AddVolume" API provided by command server 208. The command request is communicated to translation layer 504 as a XML message using the TCP/IP protocol.

An example of a XML API, with an "AddVolume" request and response is provided below (in the XML API, this is called "AddLUN" or "AddVolume"):

```
<?xml version="1.0"?>
<HiCommandServerMessage>
<APIInfo version="1.0"/>
<Request>
<StorageManager>
<Add target="LUN">
<StorageArray objectID="object ID">
<Path
    name="MyPath"
    portID="0"
    scsiID="15"
    lun="12"
    devNum="10"
>
</Path>
</StorageArray>
</Add>
</StorageManager>
</Request>
</HiCommandServerMessage>
And here is the response:
<?xml version="1.0">
<HiCommandServerMessage>
<APIInfo version="1.0"/>
<Response>
<EchoCommand
    name="AddLUN"
    status="COMPLETED"
    result="0"
    resultSource="AddLUN agent"
    messageID="100"
/>
<ResultList>
<StorageArray objectID="object ID">
<Path
    objectID="path.1"
    name="MyPath"
    portID="0"
    scsiID="15"
    lun="12"
    devNum="10"
/>
</StorageArray>
</ResultList>
</Response>
```

Translation layer 504 authenticates and authorizes the requested command and translates it to a common standard format (shown as an internal message format). The translated command request is then forwarded to agent layer 508 in an internal message format. Agent dispatcher 516 validates the command request using validation engine 520. Upon successful validation, agent dispatcher 516 selects and invokes an AddVolume agent 518 to process the command request.

AddVolume agent 518 determines the various operations corresponding to the requested command. AddVolume agent 518 invokes APIs or functions provided by transport layer 508 to perform the various operations. As shown in FIG. 6, AddVolume agent 518 determines that the command to add a volume comprises the following operations: gaining exclusive access to (or locking) the storage array, getting the latest data configuration of the storage array, adding a volume to the storage array, verifying that the volume was properly added, and releasing the lock on the storage array. For each of these operations, AddVolume agent 518 invokes an API provided by transport layer 508 (e.g., "Lock" API, "Refresh Data" API, "AddPath" API, and "Unlock API"). AddVolume 518 also accumulates results for the invoked APIs.

Transport layer 508 is configured to communicate with storage array 216 using a communication protocol understood by storage array 216. As shown in FIG. 6, transport layer 508 communicates with storage array 216 using the SNMP protocol. For each API or function invoked by AddVolume agent 518, transport layer 508 determines command functions or APIs in the communication protocol of the storage array. As shown in FIG. 6, transport layer 508 determines SNMP commands for functions/APIs invoked by AddVolume agent 518. These SNMP commands are then communicated to storage array 216.

Transport layer 508 receives responses/results of the SNMP commands communicated to storage array 216. Various different techniques such as polling, detection of traps, etc. may be used by transport layer 508 to detect the responses. For example, since SNMP uses the UDP protocol, in order to ensure that response messages are not missed, transport layer 508 may use polling techniques, wait for SNMP traps, and use combinations of polling and trap detection techniques to detect the responses. Transport layer 508 communicates these responses to agent layer 506. Agent layer 506 accumulates the results and responses received from transport layer 508. Based upon the results and responses received from transport layer 508, agent layer 506 generates a result/response that is communicated to translation layer 504. Translation layer 504 then communicates the response to ERM application 212. In the embodiment depicted in FIG. 6, the result is communicated to ERM application 212 as an XML message.

Figure 7:
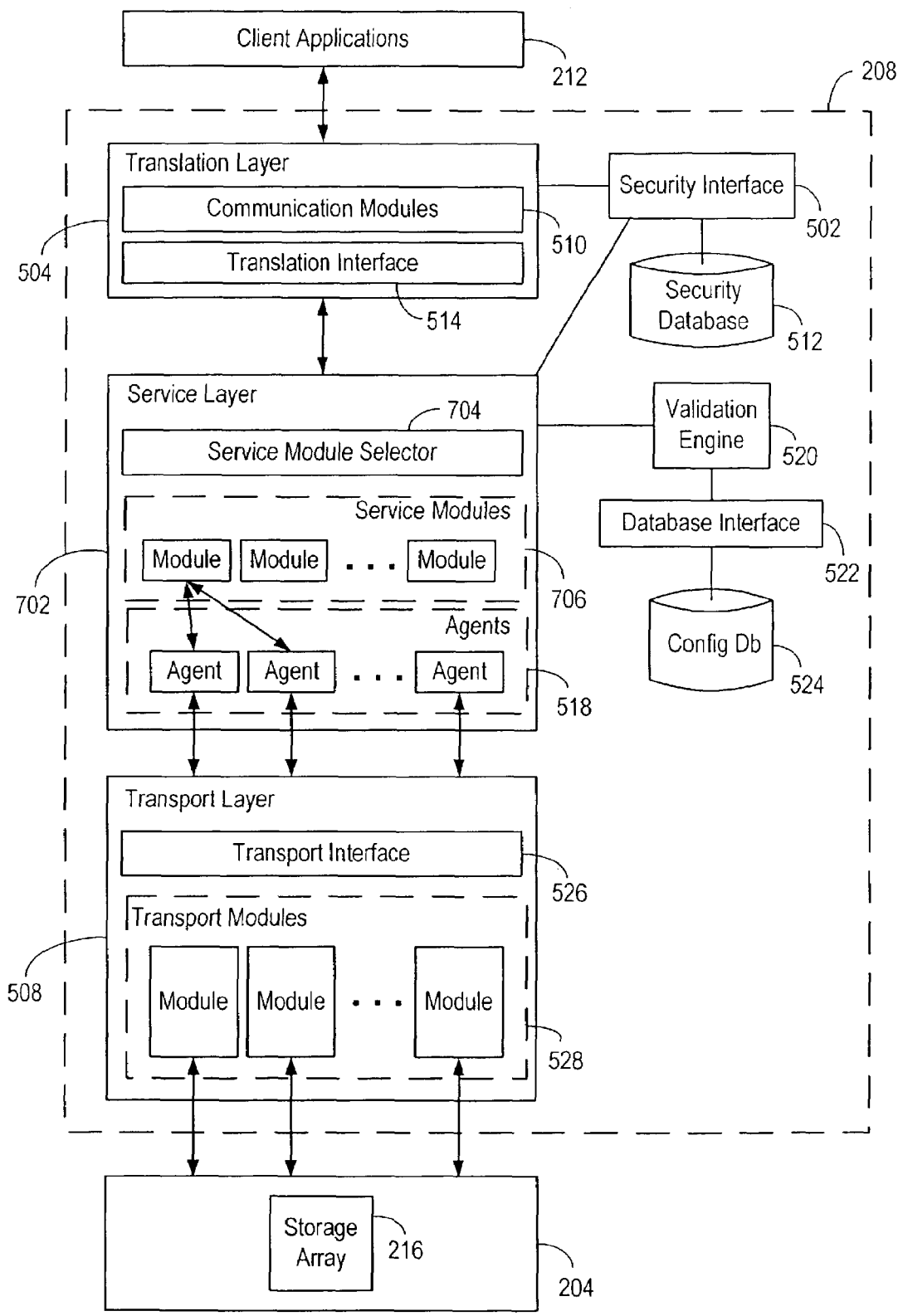
FIG. 7 depicts another simplified block diagram of a command server according to an embodiment of the present invention.

FIG. 7 depicts another simplified block diagram of command server 208 according to an embodiment of the present invention. The embodiment depicted in FIG. 7 is similar to the embodiment depicted in FIG. 5, except that agent layer 506 has been replaced by a service layer 702. The descriptions of translation layer 504, security layer 502, and transport layer 508 are the same as described earlier with reference to FIG. 5. The architecture depicted in FIG. 7 is merely illustrative of an embodiment incorporating the present invention and does not limit the scope of the invention as recited in the claims. One of ordinary skill in the art would recognize other variations, modifications, and alternatives.

Service layer 702 comprises a service module selector 704, a set of service modules 706, and a set of agents 518. For each translated command request received from translation layer 504, service module selector 704 is configured to select one or more service modules 706 for processing the command request. For example, service selector module 704 may select a "StorageManager" module for processing an AddVolume command request received from a client application.

Each selected service module 706 is configured to select one or more agents 518 for processing the command request. For example, the "StorageManager" module may select an "AddVolume" agent to process the AddVolume command request. As described above, each agent is configured to perform a specific set of operations. For example, the AddVolume agent is configured to perform operations related to adding a volume to a storage array. These operations may include gaining exclusive access to (or locking) the storage array, getting the latest data configuration of the storage array, adding a volume to the storage array, verifying that the volume was properly added, releasing the lock on the storage array, and other operations.

According to an embodiment of the present invention, an agent directs performance of an operation by invoking one or more APIs or functions provided by transport layer 508. For example, the AddVolume agent may invoke a first transport layer API to lock the storage, a second API to get the latest data configuration of the storage array, a third API to add a volume to the storage array, a fourth API to verify that the volume was properly added, a fifth API to release the lock on the storage array, and so on.

Service layer 702 is also configured to accumulate responses received from transport layer 508 in response to APIs invoked by the agents. Service layer 702 is configured to generate a response for the command request received from translation layer 504 based upon the responses received from transport layer 508. The generated response is then communicated to the client application via translation layer 504.

According to an embodiment of the present invention, service layer 702 validates the requested command using validation engine 520. Validation includes several tasks including ensuring that the parameters (if any) provided for the requested command are correct (e.g., the values of the parameters are within a correct range, the specified object such as Port or storage device (e.g., LDEV) actually exists on the array). Validation engine makes use of database interface 522 and information stored in configuration database 524 to perform the validation. According to an embodiment of the present invention, configuration database 524 stores a cached copy of the configuration (ports, paths, storage devices (LDEVs)) for each storage array in the storage environment. Service layer 702 may also make use of services provided by security layer 702.

Each storage array may comprise several elements (such as ports, disk drives, logical devices (LDEVs), and so on). Each element may be characterized by multiple properties. For example, a port has a number of properties that help define characteristics of the port such as port identifier, port type (e.g., Fibre), Fibre Address, Port world Wide Name, and so on. Using conventional techniques such as SNMP, multiple commands are required to obtain the multiple properties for the multiple elements of a storage array. For example, a storage array may comprise three elements X, Y, and Z as shown in Table 1 (see below).

TABLE 1

Elements and properties

| Element | Property A | Property B | Property C |
|---------|------------|------------|------------|
| X | 1 | 2 | 3 |
| Y | 12 | 13 | 14 |
| Z | 100 | 101 | 102 |

Each element may further comprise three properties as shown in Table 1. For this embodiment, a total of nine SNMP "get" commands would be required to obtain the properties for the elements.

According to an embodiment of the present invention, the values for the various properties of elements of a storage array can be obtained or set using a single command API. For example, a single API may be provided for obtaining the values depicted in Table 1. The present invention thus provides simplified APIs for obtaining multiple values of a storage array. Accordingly, a single API may be used to perform "table operations" (i.e., operations to set or get multiple values for a storage environment that may be stored or represented as a table). For example, an API may be provided for requesting a list of all storage arrays under management in a storage environment and a list of Ports in each storage array. A response to the request includes information listing all the storage arrays, Port elements for each storage array, and properties of the Port elements.

Table 2 depicts examples of high level commands that can be invoked by client applications according to an embodiment of the present invention. Table 2 also list APIs that are provided by command server 208 and that may be invoked by client applications for performing the high level commands. A brief simplified description of each high level command is also provided. Table 2 is not intended to reduce the scope of the present invention. Various other high level commands and APIs are also included within the scope of the present invention.

TABLE 2

| High Level Command | APIs | Description |
|--------------------|------|-------------|
| Get Server Info | GetServerInfo | Get command server 208 information including server version, server URL, etc. |
| Get Request Status | GetRequestStatus | Allows the client application to check the current status of a command, given its unique message ID. |
| Add Object Name | AddObjectName | Adds a name to an existing object inside the command server 208. |
| Delete Object Name | DeleteObjectName | Deletes the name of an object inside the command server 208. The object itself is not deleted. |
| Modify Object Name | ModifyObjectName | Modifies the name of an object inside the command server 208. |

TABLE 2-continued

| High Level Command | APIs | Description |
|---|---|---|
| Get Object Name | GetObjectName | Retrieves the name of an object. |
| Add User | AddUser | Used to add another user to the command server 208. |
| Delete User | DeleteUser | Used to remove a user from the command server 208. |
| Modify User | ModifyUser | Used to change the information about a user. |
| Get User | GetUser | Used to get information on one or more command server 208 users. (table operation—can return all users in one command) |
| Add User Group | AddUserGroup | Used to add another category of users to the command server 208. |
| Delete User Group | DeleteUserGroup | Delete an Access Control List (ACL) Group from the command server 208. Any users that are still in this group are placed in a "no-access" group. |
| Modify User Group | ModifyUserGroup | Used to change the description of an existing group in command server 208. |
| Get User Group | GetUserGroup | Returns a list of the groups and the associated users on this command server 208. (table operation—can return all users groups in one command) |
| Add User Rule | AddUserRule | Adds an Access Control List rule to the command server 208. |
| Delete User Rule | DeleteUserRule | Deletes an Access Control List rule from the command server 208. |
| Get User Rule | GetUserRule | Gets the Access Control List rules from the command server 208. (table operation—can return all user rules in one command) |
| Add Storage Array | AddStorageArray | Adds a storage array to the command server 208 repository. |
| Delete Storage Array | DeleteStorageArray | Removes a storage array from the command server 208 repository. |
| Add HostStorageDomain | AddHostStorageDomain | Adds a HostStorageDomain. |
| Delete HostStorageDomain | DeleteHostStorageDomain | Removes a HostStorageDomain. |
| Add Logical Unit (LUN) | AddLUN | Defines a path from a host to a logical unit on a storage array. A WWN can be specified to secure the LUN at the same time. |
| Delete LUN | DeleteLUN | Removes a path from a host to a logical unit on a storage array. A WWN can be specified and access will be removed for just that WWN. |
| Add WWNForHostStorage-Domain | AddWWNForHostStorageDomain | Secures logical units under a HostStorageDomain by assigning a WWN to it. |
| Delete WWNForHostStorage-Domain | DeleteWWNForHostStorageDomain | Removes access to logical units under a HostStorageDomain |
| Delete WWN | DeleteWWN | Remove a WWN from a port. |
| Delete WWN Group | DeleteWWNGroup | Remove a WWN Group. |
| Delete LUN Group | DeleteLUNGroup | Remove a LUN Group. |
| Add Array Group | AddArrayGroup | Adds (creates) an array group. |
| Delete Array Group | DeleteArrayGroup | Deletes an array group. |
| Add Spare Drive | AddSpareDrive | Designates a drive as a spare. |
| Delete Spare Drive | DeleteSpareDrive | Removes a spare drive. |
| Add Logical Unit | AddLogicalUnit | Creates a LogicalUnit on an ArrayGroup. Valid for all subsystems. Requires VLVI program product for 9900. |
| Delete Logical Unit | DeleteLogicalUnit | Deletes a LogicalUnit on an ArrayGroup. Valid for all subsystems. Requires VLVI program product for 9900. |
| Modify Port | ModifyPort | Modify attributes on Port and HostStorageDomain. Topology, Fibre Address LUN Security and Channel Speed of Port and HostMode of HostStorageDomain can be changed via this command. |
| Modify Port Controller | ModifyPortController | Modify attributes on PortController. |
| Get Storage Array | GetStorageArray | Gets information on storage arrays discovered via the Discovery operation. The client can specify one or more storage arrays to return information on, or have information on all storage arrays known to command server 208 returned. By specifying sub-elements (e.g., Path or |

TABLE 2-continued

| High Level Command | APIs | Description |
|---|---|---|
| | | LogicalUnit), information on those elements can be returned. (table operation—can return all storage arrays in one command. Can also return all Ports, paths, LDEVs, etc. included within one or all storage arrays in one command.) |
| Add Logical Group | AddLogicalGroup | Creates a logical grouping of related objects on the command server 208. |
| Delete Logical Group | DeleteLogicalGroup | Deletes a previously created logical group from the command server 208. |
| Modify Logical Group | ModifyLogicalGroup | Changes the attributes of a logical group. |
| Get Logical Group | GetLogicalGroup | Returns a list of the logical groups and their current contents. (table operation—can return all logical groups in one command) |
| Add Object For Logical Group | AddObjectForLogicalGroup | Adds the specified object to the specified Logical Group on the command server 208. The object must already have been created on the command server 208. |
| Delete Object For Logical Group | DeleteObjectForLogicalGroup | Deletes the specified objects from the specified Logical Group on the command server 208. |
| Add Host | AddHost | Adds information about a host server to the command server 208. |
| Delete Host | DeleteHost | Deletes information about a host server from the command server 208. |
| Modify Host | ModifyHost | Allows user to update Host name and replace WWNs associated with that host. |
| Get Host | GetHost | Gets information about host servers currently listed on the command server 208. (table operation—can return all hosts in one command) |
| Add Host Info | AddHostInfo | Add information to the command server 208 database about a host server's file system and HBA information connected to a LUN on a storage array managed by command server 208. |
| Delete Host Info | DeleteHostInfo | Delete the information added with Add Host Info. |
| Modify Host Info | ModifyHostInfo | Update the command server 208 database to reflect information gathered by a host program having access to the file system, and HBA SCSI inquiry information. |
| Get Host Info | GetHostInfo | Retrieve the information added with Add Host Info. (table operation—can return all HostInfo records in one command) |
| Add Subscriber | AddSubscriber | Tells the command server 208 that this system wishes to receive asynchronous responses, either as a result of command completion, configuration change, or when an error occurs (i.e., traps) from the command server 208. |
| Delete Subscriber | DeleteSubscriber | Removes a client registered via the AddSubscriber function. The client will receive no further asynchronous messages from command server 208. It can still poll for results using the CheckStatus function. |
| Get Alerts | GetAlerts | Allows the client to receive historical Alert information. (table operation—can return all alerts in one command) |
| Delete Alerts | DeleteAlerts | Allows the client to selectively delete Alert information. |
| Get Messages | GetMessages | Returns messages from the Command server 208. |
| Add URL Link | AddURLLink | Links a command server 208 object to a URL. |
| Delete URL Link | DeleteURLLink | Removes the link from a command server 208 object to a URL. |
| Get URL Link | GetURLLink | Returns the URL links that exist. (table operation—can return all URL links in one command) |
| Get Log File | GetLogFile | Gets a command server 208 log file. |
| Modify Debug Level | ModifyDebugLevel | Set the amount of debugging information generated. |
| Get Debug Level | GetDebugLevel | Gets the current debugging level. |

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of managing a storage environment, the method comprising:
   receiving a request at a server computer to perform a first command on a storage array in the storage environment, the request being generated by a client computer according to a command interface of the server computer;
   determining a first plurality of commands in accordance with Simple Network Management Protocol (SNMP) for servicing the request to perform the first command;
   communicating the first plurality of commands from the server computer to the storage array over a communication network;
   detecting one or more responses from the storage array to the first plurality of commands at the server computer; and
   generating a first response to the request to perform the first command based upon the one or more responses.

2. The method of claim 1 wherein the request to perform the first command is received from a client computer, the method further comprising communicating the first response to the client computer.

3. The method of claim 2 wherein the request to perform the first command is received from an application program using a second communication protocol that is different from SNMP.

4. The method of claim 1 wherein the first command is expressed using Extensible Markup Language (XML).

5. The method of claim 1 wherein detecting the one or more responses to the first plurality of commands comprises:
   using a polling loop to detect at least one response from the one or more responses.

6. The method of claim 5 wherein detecting the one or more responses to the first plurality of commands further comprises:
   detecting at least one response from the one or more responses by detecting conditions generated by the storage array in response to the first plurality of commands.

7. The method of claim 1 wherein determining the first plurality of commands comprises identifying one or more modules for processing the first command, wherein the one or more modules are configured to identify the set of operations corresponding to the first command.

8. The method of claim 1 wherein the first command is a command for obtaining multiple values from the storage array and the first response comprises the multiple values.

9. The method of claim 1 wherein the request is received in response to invocation of an application programming interface (API).

10. A method of managing a storage environment, the method comprising:
    providing an application programming interface (API) at a server computer for controlling one or more storage arrays in the storage environment, the API abstracting commands of the one or more storage devices;
    receiving a signal at the server computer indicating invocation of the API by a client computer;
    determining a first command of the API to be performed by the server computer on a target storage array;
    determining a first plurality of commands corresponding to the first command, wherein the first plurality of commands is in accordance with Simple Network Management Protocol (SNMP) for performing a function of the target storage array;
    communicating the first plurality of commands from the server computer to the target storage array over a communication network;
    detecting one or more responses to the first plurality of commands from the target storage array at the server computer; and
    generating a first response to client computer based upon the one or more responses.

11. The method of claim 10 wherein:
    determining the first plurality of commands corresponding to the first command comprises:
       determining a set of operations corresponding to the first command; and
       determining one or more SNMP commands for performing operations in the set of operations; and
    detecting the one or more responses to the first plurality of commands comprises detecting SNMP traps generated by executing the one or more SNMP commands.

12. A command server for managing communication between a client computer and a storage environment comprising:
    a processor;
    a memory coupled to the processor, the memory configured to store a plurality of code modules for execution by the processor, the plurality of code modules comprising:
       a code module for receiving a request to perform a first command on a storage array in the storage environment from the client computer;
       a code module for determining a first plurality of commands in accordance with Simple Network Management Protocol (SNMP) for servicing the request to perform the first command;
       a code module for communicating the first plurality of commands to the storage array over a communication network;
       a code module for detecting at the command server one or more responses to the first plurality of commands; and
       a code module for generating a first response to the request to perform the first command based upon the one or more responses.

13. The system of claim 12 wherein the request to perform the first command is received from an application program of the client computer, the plurality of code modules further comprises a code module for communicating the first response to the application program.

14. The system of claim 13 wherein the request to perform the first command is received from the application program using a second communication protocol that is different from SNMP.

15. The system of claim 12 wherein the first command is expressed using Extensible Markup Language (XML).

16. The system of claim 12 wherein the code module for determining the first plurality of commands corresponding to the first command comprises:
   a code module for determining a set of operations of the storage array corresponding to the first command;
   a code module for representing the set of operations as SNMP commands.

17. The system of claim 16 wherein the code module for determining the set of operations corresponding to the first command comprises a code module for identifying one or more modules for processing the first command, wherein the one or more modules are configured to identify the set of operations corresponding to the first command.

18. The system of claim 12 wherein the code module for detecting the one or more responses to the first plurality of commands comprises:
   a code module for using a polling loop to detect at least one response from the one or more responses.

19. The system of claim 18 wherein the code module for detecting the one or more responses to the first plurality of commands further comprises:
   a code module for detecting at least one response from the one or more responses by detecting trap conditions generated by the storage array in response to the first plurality of commands.

20. The system of claim 12 wherein the first command is a command for obtaining multiple values from the storage array and the first response comprises the multiple values.

21. The system of claim 12 wherein the request is received in response to invocation of an application programming interface (API).

22. A command server for managing communication between a client computer and a storage environment comprising:
   a processor;
   a memory coupled to the processor, the memory configured to store a plurality of code modules for execution by the processor, the plurality of code modules comprising:
      a code module for receiving a signal indicating invocation of a first application programming interface (API);
      a code module for determining a first command of the first API to be performed on a storage array;
      a code module for determining a first plurality of commands corresponding to the first command, wherein the first plurality of commands is in accordance with Simple Network Management Protocol (SNMP) for performing a fraction of the storage array;
      a code module for communicating the first plurality of commands to the storage array over a communication network;
      a code module for detecting one or more responses from the storage array at the command server to the first plurality of commands; and
      a code module for generating a first response to the first API based upon the one or more responses.

23. The system of claim 22 wherein:
   the code module for determining the first plurality of commands corresponding to the first command comprises:
      a code module for determining a set of operations of the storage array corresponding to the first command; and
      a code module for determining one or more SNMP commands for performing operations in the set of operations; and
   the code module for detecting the one or more responses to the first plurality of commands comprises a code module for detecting SNMP traps generated by executing the one or more SNMP commands.

24. A computer-readable storage medium encoded with a computer program for managing a storage environment, the computer program comprising:
   code for receiving at a server computer a request to perform a first command on a storage array in the storage environment, the request being specified according to an application programming interface (API) of the computer program;
   code for determining a first plurality of commands in accordance with Simple Network Management Protocol (SNMP) for servicing the request to perform the first command;
   code for communicating the first plurality of commands to the storage array over a communication network;
   code for detecting one or more responses from the storage array at the server computer to the first plurality of commands; and
   code for generating a first response to the request to perform the first command based upon the one or more responses.

25. The computer-readable storage medium of claim 24 wherein: the request to perform the first command is received using a second communication protocol tat is different from SNMP.

26. The computer-readable storage medium of claim 24 wherein the code for determining the first plurality of commands corresponding to the first command comprises:
   code for determining a set of operations of the storage array corresponding to the first command; and
   code for representing the set of operations as a plurality of SNMP commands.

27. The computer-readable storage medium of claim 24 wherein the first command is a command for obtaining multiple values from the storage array and the first response comprises the multiple values.

28. The computer-readable storage medium of claim 24 wherein the request is received in response to invocation of an application programming interface (API).

29. A computer-readable storage medium encoded with a computer program for managing a storage environment, the computer program comprising:
   code for receiving a signal at a sewer computer indicating invocation of a first application programming interface (API);
   code for determining a first command of the first API to be performed by the server computer;
   code for determining a first plurality of commands corresponding to the first command, wherein the first plurality of commands is in accordance with Simple Network Management Protocol (SNMP) for performing a function of the target storage array;

code for communicating the first plurality of commands from the server computer to the storage array over a communication network;

code for detecting one or more responses to the first plurality of commands from the storage array at the server computer; and code for generating a first response to the client computer based upon the one or more responses.

30. The computer-readable storage medium of claim 29 wherein:

the code for determining the first plurality of commands corresponding to the first command comprises:

code for determining a set of operations corresponding to the first command; and code for determining one or more SNMP commands for performing operations in the set of operations; and the code for detecting the one or more responses to the first plurality of commands comprises code for detecting SNMP traps generated by executing the one or more SNMP commands.

* * * * *